(12) United States Patent
Kousaka

(10) Patent No.: US 11,479,654 B2
(45) Date of Patent: Oct. 25, 2022

(54) METHOD FOR PRODUCING RESIN FOR OPTICAL COMPONENT, RESIN FOR OPTICAL COMPONENT, SPECTACLE LENS, AND SPECTACLES

(71) Applicant: HOYA LENS THAILAND LTD., Pathumthani (TH)

(72) Inventor: Masahisa Kousaka, Shinjuku-ku (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 318 days.

(21) Appl. No.: 16/367,698

(22) Filed: Mar. 28, 2019

(65) Prior Publication Data

US 2019/0225771 A1    Jul. 25, 2019

Related U.S. Application Data

(63) Continuation of application No. PCT/JP2018/036478, filed on Sep. 28, 2018.

(30) Foreign Application Priority Data

Sep. 29, 2017  (JP) .............................. JP2017-192163

(51) Int. Cl.
| | |
|---|---|
| *C08K 5/3475* | (2006.01) |
| *C08G 18/75* | (2006.01) |
| *C08G 18/52* | (2006.01) |
| *C08G 18/38* | (2006.01) |
| *G02C 7/00* | (2006.01) |
| *G02B 1/04* | (2006.01) |
| *C08G 18/76* | (2006.01) |
| *C08K 5/00* | (2006.01) |

(52) U.S. Cl.
CPC ........ *C08K 5/3475* (2013.01); *C08G 18/3876* (2013.01); *C08G 18/52* (2013.01); *C08G 18/755* (2013.01); *C08G 18/757* (2013.01); *C08G 18/758* (2013.01); *C08G 18/7642* (2013.01); *C08K 5/005* (2013.01); *G02B 1/04* (2013.01); *G02C 7/00* (2013.01); *G02B 1/041* (2013.01)

(58) Field of Classification Search
CPC ....................................................... G02B 1/04
See application file for complete search history.

(56) References Cited

U.S. PATENT DOCUMENTS

| | | | |
|---|---|---|---|
| 6,770,692 B1 | 8/2004 | Kobayashi et al. | |
| 7,713,452 B2 * | 5/2010 | Kauffman | C07D 263/57 264/1.32 |
| 2007/0129530 A1 | 6/2007 | Watanabe et al. | |
| 2008/0058477 A1 | 3/2008 | Watanabe et al. | |
| 2009/0225425 A1 | 9/2009 | Jang et al. | |
| 2009/0264613 A1 | 10/2009 | Kuma et al. | |
| 2009/0270583 A1 | 10/2009 | Kuma et al. | |
| 2010/0216905 A1 | 8/2010 | Kuwamura et al. | |
| 2010/0298521 A1 | 11/2010 | Kuma et al. | |
| 2011/0015314 A1 | 1/2011 | Takeshima et al. | |
| 2011/0065887 A1 | 3/2011 | Kuma et al. | |
| 2011/0178264 A1 | 7/2011 | Kuma et al. | |
| 2011/0245531 A1 | 10/2011 | Kuma et al. | |
| 2013/0324631 A1 | 12/2013 | Kuwamura et al. | |
| 2014/0039145 A1 | 2/2014 | Jang et al. | |
| 2014/0323652 A1 | 10/2014 | Itoh | |
| 2015/0018507 A1 | 1/2015 | Jang et al. | |
| 2015/0226879 A1 | 8/2015 | Jang et al. | |
| 2015/0291758 A1 | 10/2015 | Kuwamura et al. | |
| 2016/0215121 A1 * | 7/2016 | Kousaka | C08L 101/00 |
| 2016/0223839 A1 * | 8/2016 | Kakinuma | C08K 5/0041 |
| 2016/0313575 A1 | 10/2016 | Kakinuma et al. | |
| 2017/0051131 A1 | 2/2017 | Hanawa et al. | |
| 2017/0057184 A1 | 3/2017 | Kakinuma | |
| 2017/0183443 A1 | 6/2017 | Kuwamura et al. | |
| 2017/0198083 A1 | 7/2017 | Kim et al. | |
| 2017/0334876 A1 | 11/2017 | Kariyazono et al. | |
| 2018/0319924 A1 | 11/2018 | Qian et al. | |
| 2019/0154878 A1 | 5/2019 | Wakiyasu | |

FOREIGN PATENT DOCUMENTS

| | | |
|---|---|---|
| CN | 1414989 A | 4/2003 |
| CN | 101003627 A | 7/2007 |
| CN | 101139430 A | 3/2008 |
| CN | 101291907 A | 10/2008 |
| CN | 101421232 A | 4/2009 |
| CN | 101821309 A | 9/2010 |
| CN | 104066716 A | 9/2014 |
| CN | 105482070 A | 4/2016 |
| CN | 105793738 A | 7/2016 |
| CN | 106008378 A | 10/2016 |
| CN | 106661183 A | 5/2017 |
| JP | H11-231102 A | 8/1999 |
| JP | H11-295502 A | 10/1999 |
| JP | 2001-131420 A | 5/2001 |
| JP | 2006-235587 A | 9/2006 |

(Continued)

OTHER PUBLICATIONS

Dec. 4, 2018 International Search Report issued in International Patent Application No. PCT/JP2018/036478.

(Continued)

*Primary Examiner* — Michael F Pepitone
(74) *Attorney, Agent, or Firm* — Oliff PLC

(57) ABSTRACT

A method for producing an optical component resin, suppressing yellowing due to addition of an ultraviolet absorber, an optical component resin, a spectacle lens, and spectacles. A method for producing an optical component resin, including a step of polymerizing a polymerizable composition containing a polythiol component, a polyisocyanate component, and an ultraviolet absorber, in which the ultraviolet absorber has a Hazen color number (APHA) of 40 or less in a toluene solution thereof having a concentration of 10% by mass, an optical component resin obtained by the producing method, an optical component formed of the optical component resin, a spectacle lens including a lens substrate formed of the optical component resin, and spectacles including the spectacle lens.

16 Claims, No Drawings

(56) References Cited

FOREIGN PATENT DOCUMENTS

| | | |
|---|---|---|
| JP | 2009-242639 A | 10/2009 |
| JP | 2012-181268 A | 9/2012 |
| JP | 2014-508207 A | 4/2014 |
| JP | 2015-533874 A | 11/2015 |
| JP | 2016-186083 A | 10/2016 |
| WO | 01/36507 A1 | 5/2001 |
| WO | 01/36508 A1 | 5/2001 |
| WO | 2015/166975 A1 | 11/2015 |
| WO | 2016/158155 A1 | 10/2016 |
| WO | 2017/047684 A1 | 3/2017 |
| WO | 2017/209104 A1 | 12/2017 |

OTHER PUBLICATIONS

May 21, 2021 Extended European Search Report issued in European Application No. 18857423.0.
Ding Zhuming et al.; "Advance in Research of Synthesis For Benzotriazoles Ultraviolet Light Absorber in China;" Tianjing Synthetic Material Research Institute, Tianjin, 300220, Jan. 2016, pp. 6-37.

* cited by examiner

METHOD FOR PRODUCING RESIN FOR OPTICAL COMPONENT, RESIN FOR OPTICAL COMPONENT, SPECTACLE LENS, AND SPECTACLES

CROSS-REFERENCE TO RELATED APPLICATIONS

This application is a continuation of International Application No. PCT/JP2018/036478, filed Sep. 28, 2018, which is a continuation of Japanese Application No. 2017-192163, filed Sep. 29, 2017.

TECHNICAL FIELD

The present disclosure relates to a method for producing an optical component resin used for a spectacle lens or the like, an optical component resin, a spectacle lens, and spectacles.

BACKGROUND ART

A resin lens is lighter than a lens formed of an inorganic material such as inorganic glass, is hard to crack, and can be dyed advantageously. Therefore, it is currently the mainstream to use a resin lens as an optical component such as a spectacle lens or a camera lens.

Patent Literature 1 describes a plastic lens formed by using a plastic lens composition mainly containing a resin material containing a urethane resin material and an ultraviolet absorber having a maximum absorption wavelength of 345 nm or more in a chloroform solution.

Patent Literature 1 describes that the plastic lens does not cause yellowing thereof due to an influence of an ultraviolet absorber, does not change a refractive index thereof or the like, and does not lower mechanical strength thereof.

CITATION LIST

Patent Literature

Patent Literature 1: JP H11-295502 A

SUMMARY

Technical Problem

Even with the plastic lens of Patent Literature 1, when a YI value representing yellowing is measured, it has become clear that the YI value varies slightly depending on a production lot even if the same ultraviolet absorber is used. Since yellowing of an optical material resin reminds deterioration, a customer dislikes yellowing. Therefore, it is required to keep the YI value low even if an ultraviolet absorber is added.

Therefore, an embodiment of the present disclosure relates to a method for producing an optical component resin, suppressing yellowing due to addition of an ultraviolet absorber, an optical component resin, a spectacle lens, and spectacles.

Solution to Problem

The present inventor has found that in production of an optical component resin, even if added ultraviolet absorbers have no difference in color tone in a solid state, when the ultraviolet absorbers are formed into a solution state and observation is performed with a relatively long optical path length, even the same compound has a difference in color tone depending on the ultraviolet absorbers. It has been found that yellowing of an optical component due to addition of the ultraviolet absorber is suppressed by setting the Hazen color number (APHA) of the ultraviolet absorber in a specific range. It could not be expected that yellowing of the optical component would be affected by the above-described slight change in color tone of the ultraviolet absorber in the optical component containing the ultraviolet absorber in an amount of only a few percent with respect to the entire optical component and having a thickness of only several millimeters to several tens of millimeters.

An embodiment of the present disclosure relates to a method for producing an optical component resin, including polymerizing a polymerizable composition containing a polythiol component, a polyisocyanate component, and an ultraviolet absorber, in which the ultraviolet absorber has a Hazen color number (APHA) of 40 or less in a toluene solution thereof having a concentration of 10% by mass.

An embodiment of the present disclosure also relates to an optical component resin obtained by the above-described producing method, an optical component formed of the optical component resin, a spectacle lens including a lens substrate formed of the optical component resin, and spectacles including the spectacle lens.

Advantageous Effects

An embodiment of the present disclosure provides a method for producing an optical component resin, suppressing yellowing due to addition of an ultraviolet absorber, an optical component resin, a spectacle lens, and spectacles.

DESCRIPTION OF EMBODIMENTS

[Method for Producing Optical Component Resin]

A method for producing an optical component resin according to an embodiment of the present disclosure includes a step of polymerizing a polymerizable composition containing a polythiol component, a polyisocyanate component, and an ultraviolet absorber.

The ultraviolet absorber has a Hazen color number (APHA) of 40 or less in a toluene solution thereof having a concentration of 10% by mass.

With the above configuration, yellowing due to addition of the ultraviolet absorber is suppressed in an optical component to be obtained.

The method for producing an optical component resin according to an embodiment of the present disclosure includes: for example, a step of mixing a polythiol component, a polyisocyanate component, and an ultraviolet absorber to obtain a polymerizable composition (hereinafter also referred to as "mixing step");

a step of degassing the polymerizable composition (hereinafter also referred to as "degassing step");

a step of injecting the polymerizable composition into a molding die (hereinafter also referred to as "injection step"); and a step of polymerizing the polymerizable composition (hereinafter also referred to as "polymerization step").

(Ultraviolet Absorber)

In the producing method according to an embodiment, the ultraviolet absorber has a Hazen color number (APHA) of 40 or less in a toluene solution thereof having a concentration of 10% by mass (hereinafter also simply referred to as "Hazen color Number (APHA)") from a viewpoint of suppressing yellowing of an optical component to be obtained.

The Hazen color number (APHA) of the ultraviolet absorber may be 38 or less, 35 or less, or 33 or less from a viewpoint of suppressing yellowing of an optical component to be obtained.

The Hazen color number (APHA) of the ultraviolet absorber may be 1 or more, 10 or more, or 20 or more, further still more preferably 25 or more.

The Hazen color number (APHA) of the ultraviolet absorber may be 1 or more and 38 or less, 10 or more and 35 or less, 20 or more, or 25 or more and 33 or less from a viewpoint of suppressing yellowing of an optical component to be obtained.

The Hazen color number (APHA) of the ultraviolet absorber is measured by the method described in Examples.

Examples of a method for adjusting the Hazen color number (APHA) of the ultraviolet absorber include a purification method such as recrystallization in an organic solvent. By repeating the purification method, an ultraviolet absorber having a lower Hazen color number (APHA) may be obtained.

Examples of the ultraviolet absorber include a benzotriazole-based compound, a benzophenone-based compound, and a dibenzoylmethane-based compound. Among these compounds, the benzotriazole-based compound and the benzophenone-based compound may be used in some embodiments.

Examples of the benzotriazole-based compound include 2-(2-hydroxy-5-methylphenyl)-2H-benzotriazole, 2-(2-hydroxy-3,5-di-tert-butylphenyl)-5-chloro-2H-benzotriazole, 2-(3-t-butyl-2-hydroxy-5-methylphenyl)-5-chloro-2H-benzotriazole, 2-(2-hydroxy-3,5-di-tert-amylphenyl)-2H-benzotriazole, 2-(2-hydroxy-3,5-di-tert-butylphenyl)-2H-benzotriazole, 2-(2-hydroxy-5-tert-butylphenyl)-2H-benzotriazole, 2-(2-hydroxy-5-octylphenyl)-2H-benzotriazole, 2-(2-hydroxy-4-ethyloxyphenyl)-2H-benzotriazole, 2-(2-hydroxy-4-propyloxyphenyl)-2H-benzotriazole, 2-(2-hydroxy-4-octyloxyphenyl)-2H-benzotriazole, and 2-(2-hydroxy-4-octyloxyphenyl)-5-chloro-2H-benzotriazole. Note that 2-(2-hydroxy-5-octylphenyl)-2H-benzotriazole is preferably 2-(2-hydroxy-5-tert-octylphenyl)-2H-benzotriazole.

Note that the tert-octyl group means a 1,1,3,3-tetramethylbutyl group.

Examples of the benzophenone-based compound include 2,4-dihydroxybenzophenone, 2-hydroxy-4-methyloxybenzophenone, 2-hydroxy-4-methyloxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, and 2,2'-dihydroxy-4-methyloxybenzophenone.

Examples of the dibenzoylmethane-based compound include 4-tert-butyl-4'-methyloxydibenzoylmethane.

One kind or two or more kinds of these compounds may be used.

Among these ultraviolet absorbers, from a viewpoint of more remarkably obtaining the above effect, a compound represented by formula (1) may be used in some embodiments.

[Chemical formula 1]

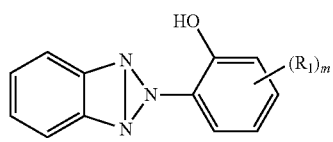

(1)

where $R_1$ represents an alkyl group having 1 or more and 12 or less carbon atoms or an alkoxy group having 1 or more and 12 or less carbon atoms, m represents an integer of 0 to 2, and when m represents 2, the plurality of $R_1$s may be the same or different.

$R_1$ represents an alkyl group having 1 or more and 12 or less carbon atoms or an alkoxy group having 1 or more and 12 or less carbon atom. Each of the alkyl group and the alkoxy group may have 1 or more and 8 or less carbon atoms, 2 or more and 8 or less carbon atoms, or 4 or more and 8 or less carbon atoms.

The alkyl group and alkoxy group may be branched or linear. Out of the alkyl group and the alkoxy group, the alkyl group may be used in some embodiments.

Examples of the alkyl group include a methyl group, an ethyl group, a propyl group, a butyl group, a pentyl group, a hexyl group, a heptyl group, an octyl group, a nonyl group, a decyl group, an undecyl group, and a dodecyl group.

Examples of the alkoxy group include a methyloxy group, an ethyloxy group, a propyloxy group, a butoxy group, a pentyloxy group, a hexyloxy group, a heptyloxy group, an octyloxy group, a nonyloxy group, a decyloxy group, an undecyloxy group, and a dodecyloxy group.

Among these groups, the ethyloxy group or the octyloxy group may be used in some embodiments.

The octyloxy group is preferably a 1,1,3,3-tetramethylbutyl group.

A substitution position of $R_1$ may be a 3-position, a 4-position, or a 5-position position based on a substitution position of a benzotriazolyl group. $R_1$ may be the 4-position in some embodiments.

m may represent 1.

Among the above-described compounds, at least one selected from the group consisting of 2-(2-hydroxy-5-methylphenyl)-2H-benzotriazole, 2-(2-hydroxy-5-octylphenyl)-2H-benzotriazole, 2-(2-hydroxy-4-octyloxyphenyl)-2H-benzotriazole, 2-(2-hydroxy-4-propyloxyphenyl)-2H-benzotriazole, and 2-(2-hydroxy-4-ethyloxyphenyl)-2H-benzotriazole may be contained in some embodiments from a viewpoint of more remarkably obtaining the above effect.

The addition amount of the ultraviolet absorber may be 0.1 parts by mass or more, 0.3 parts by mass or more, or 0.4 parts by mass or more, and 2 parts by mass or less, 1.5 parts by mass or less, or 1.2 parts by mass or less with respect to 100 parts by mass of the total amount of the polythiol component and the polyisocyanate component from a viewpoint of more remarkably obtaining the above effect.

The addition amount of the ultraviolet absorber is preferably 0.1 parts by mass or more and 2 parts by mass or more or less, more preferably 0.3 parts by mass or more and 1.5 parts by mass or less, still more preferably 0.4 parts by mass or more and 1.2 parts by mass or less with respect to 100 parts by mass of the total amount of the polythiol component and the polyisocyanate component from a viewpoint of more remarkably obtaining the above effect.

<Mixing Step>

In the mixing step, the polythiol component, the polyisocyanate component, and the ultraviolet absorber may be mixed in any order. However, in some embodiments, the polyisocyanate component and the ultraviolet absorber (i) may be mixed, and then the resulting mixture may be mixed with the polythiol component (ii) from a viewpoint of further enhancing transparency of the optical component.

In (i), the polyisocyanate component generally has low viscosity and good solubility, and therefore the ultraviolet absorber is easily dissolved therein. In (i), in order to shorten dissolution time, it may be used to add and dissolve the entire amount of the ultraviolet absorber to the total amount of the polyisocyanate component.

[Polymerizable Composition]

The polymerizable composition obtained in the mixing step contains a polythiol component, a polyisocyanate component, and an additive. Each of the components will be described below.

(Polythiol Component)

Examples of the polythiol component include an ester compound of a polyol compound and a mercapto group-containing carboxylic acid compound, a linear or branched aliphatic polythiol compound, a polythiol compound having an alicyclic structure, and an aromatic polythiol compound.

In the ester compound of a polyol compound and a mercapto group-containing carboxylic acid compound, examples of the polyol compound include a compound having two or more hydroxy groups in a molecule thereof.

Examples of the polyol compound include ethylene glycol, diethylene glycol, propanediol, propanetriol, butanediol, trimethylolpropane, bis(2-hydroxyethyl) disulfide, pentaerythritol, and dipentaerythritol.

Examples of the mercapto group-containing carboxylic acid compound include thioglycolic acid, mercaptopropionic acid, a thiolactic acid compound, and thiosalicylic acid.

Examples of the ester compound of a polyol compound and a mercapto group-containing carboxylic acid compound include ethylene glycol bis(2-mercaptoacetate), ethylene glycol bis(2-mercaptopropionate), diethylene glycol bis(2-mercaptoacetate), diethylene glycol bis(2-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(2-mercaptopropionate), pentaerythritol tetrakis(3-mercaptopropionate), dipentaerythritol hexakis(2-mercaptoacetate), and dipentaerythritol hexakis(3-mercaptopropionate).

Examples of the linear or branched aliphatic polythiol compound include 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 2,2-dimethylpropane-1,3-dithiol, 3,4-dimethyloxybutane-1,2-dithiol, 2,3-dimercapto-1-propanol, 1,2-dimercaptopropyl methyl ether, 2,3-dimercaptopropyl methyl ether, 2-(2-mercaptoethylthio) propane-1,3-dithiol, 2,2-bis(mercaptomethyl)-1,3-propanedithiol, bis(mercaptomethylthio) methane, tris(mercaptomethylthio) methane, bis(2-mercaptoethylthio) methane, 1,2-bis(mercaptomethylthio) ethane, 1,2-bis(2-mercaptoethylthio) ethane 1,3-bis(mercaptomethylthio) propane, 1,3-bis(2-mercaptoethylthio) propane, 1,1,2,2-tetrakis(mercaptoethylthio) ethane, 1,1,3,3-tetrakis(mercaptoethylthio) propane, 3-mercaptomethyl-1,5-dimercapto-2,4-dithiapentane, tetrakis(mercaptoethylthio) propane, bis(2-mercaptoethyl) ether, bis(2-mercaptoethyl) sulfide, bis(2-mercaptoethyl) disulfide, bis(2-mercaptoethylthio)-3-mercaptopropane, 4-mercaptomethyl-1,8-dimercapto-3,6-dithiaoctane, 4,7-bis(mercaptomethyl)-3,6,9-trithia-1,11-undecanedithiol, 4, 8-bis(mercaptomethyl)-3,6,9-trithia-1,11-undecanedithiol, and 5,7-bis(mercaptomethyl)-3,6,9-trithia-1,11-undecanedithiol.

Examples of the polythiol compound having an alicyclic structure include 1,1-cyclohexanedithiol, 1,2-cyclohexanedithiol, methylcyclohexanedithiol, bis(mercaptomethyl) cyclohexane, 2-(2,2-bis(mercaptomethylthio) ethyl)-1,3-dithietane, 2,5-bis(mercaptomethyl)-1,4-dithiane, and 4,8-bis(mercaptomethyl)-1,3-dithiane.

Examples of the aromatic polythiol compound include 1,3-dimercaptobenzene, 1,4-dimercaptobenzene, 1,3-bis(mercaptomethyl) benzene, 1,4-bis(mercaptomethyl) benzene, 1,3-bis(mercaptoethyl) benzene, 1,4-bis(mercaptoethyl) benzene, 1,3,5-trimercaptobenzene, 1,3,5-tris(mercaptomethyl) benzene, 1,3,5-tris(mercaptoethyl) benzene, 4,4'-dimercaptobiphenyl, 4,4'-dimercaptobibenzyl, 2,5-toluenedithiol, 1,5-naphthalenedithiol, 2,6-naphthalenedithiol, 2,7-naphthalene dithiol, 2,4-dimethylbenzene-1,3-dithiol, 4,5-dimethylbenzene-1,3-dithiol, 9,10-anthracene dimethanethiol, 1,3-di(p-methyloxyphenyl) propane-2,2-dithiol, 1,3-diphenylpropane-2, 2-dithiol, phenyl methane-1, 1-dithiol, and 2,4-di(p-mercaptophenyl) pentane.

One kind or two or more kinds of these compounds may be used.

The polythiol component may contain at least one selected from the group consisting of 2,5-bis(mercaptomethyl)-1,4-dithiane, pentaerythritol tetrakis(2-mercaptoacetate), pentaerythritol tetrakis(3-mercaptopropionate), 4-mercaptomethyl-1,8-dimercapto-3,6-dithiaoctane, 4,7-bis(mercaptomethyl)-3,6,9-trithia-1,11-undecanedithiol, 4,8-bis(mercaptomethyl)-3,6,9-trithia-1,11-undecanedithiol, 5,7-bis(mercaptomethyl)-3,6,9-trithia-1,11-undecanedithiol, trimethylolpropane tris(2-mercaptoacetate), trimethylol propane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate), more preferably contains at least one selected from the group consisting of 4,7-bis(mercaptomethyl)-3,6,9-tritia-1,11-undecanedithiol, 4,8-bis(mercaptomethyl)-3,6,9-trithia-1,11-undecanedithiol, 5,7-bis(mercaptomethyl)-3,6,9-tritia-1,11-undecanedithiol, 4-mercaptomethyl-1,8-dimercapto-3,6-dithiaoctane, pentaerythritol tetrakis(3-mercaptopropionate), 2,5-bis(mercaptomethyl)-1,4-dithiane, and pentaerythritol tetrakis(2-mercaptoacetate) from a viewpoint of more remarkably obtaining the above effect.

The addition amount of the polythiol component may be 40% by mass or more, 43% by mass or more, or 45% by mass or more, and 60% by mass or less, 55% by mass or less, or 53% by mass or less with respect to the total amount of the polythiol component and the polyisocyanate component The addition amount of the polythiol component may be 40% by mass or more and 60% by mass or less, 43% by mass or more and 55% by mass or less, or 45% by mass or more and 53% by mass or less with respect to the total amount of the polythiol component and the polyisocyanate component.

(Polyisocyanate Component)

Examples of the polyisocyanate component include a polyisocyanate compound having an aromatic ring, an alicyclic polyisocyanate compound, and a linear or branched aliphatic polyisocyanate compound.

Examples of the polyisocyanate compound having an aromatic ring include diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene bis(phenyl isocyanate), 4,4'-methylene bis(2-methyl phenyl isocyanate), bibenzyl-4,4'-diisocyanate, bis(isocyanatophenyl) ethylene, 1,3-bis(isocyanatomethyl) benzene, 1,4-bis(isocyanatomethyl) benzene, 1,3-bis(isocyanatoethyl) benzene, bis(isocyanatopropyl) benzene, α,α,α',α'- tetramethylxylylene diisocyanate, bis(isocyanatobutyl) benzene, bis(isocyanatomethyl) naphthalene, bis(isocyanatomethylphenyl) ether, 2-isocyanatophenyl-4-isocyanatophenyl sulfide, bis(4-isocyanatophenyl) sulfide, bis(4-isocyanatomethylphenyl) sulfide, bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, bis(3-methyloxy-4-isocyanatophenyl) disulfide, and bis(4-methyloxy-3-isocyanatophenyl) disulfide.

Examples of the alicyclic polyisocyanate compound include 1,3-diisocyanatocyclohexane, isophorone diisocyanate, 1,3-bis(isocyanatomethyl) cyclohexane, 1,4-bis(isocyanatomethyl) cyclohexane, dicyclohexylmethane-4,4'-diisocyanate, 2,5-bis(isocyanatomethyl)-bicyclo[2.2.1]heptane, 2, 6-bis(isocyanatomethyl)-bicyclo[2.2.1]heptane, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane.

Examples of the linear or branched aliphatic polyisocyanate compound include hexamethylene diisocyanate, 2,2-dimethylpentane diisocyanate, 2,2,4-trimethylhexane diisocyanate, butenediisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanate 4-isocyanatomethyloctane, bis(isocyanatoethyl) carbonate, bis(isocyanatoethyl) ether, lysine diisocyanatomethyl ester, lysine triisocyanate, bis(isocyanatomethyl) sulfide, bis(isocyanatoethyl) sulfide, bis(isocyanatopropyl) sulfide, bis(isocyanatohexyl) sulfide bis(isocyanatomethyl) sulfone, bis(isocyanatomethyl) disulfide, bis(isocyanatoethyl) disulfide, bis(isocyanatopropyl) disulfide, bis(isocyanatomethylthio) methane, bis(isocyanatoethylthio) methane, bis(isocyanatomethylthio) ethane, bis(isocyanatoethylthio) ethane, 1,5-diisocyanate 2-isocyanatomethyl-3-pentane, 1,2,3-tris(isocyanatomethylthio) propane, 1,2,3-tris (isocyanatoethylthio) propane, 3,5-dithia-1,2,6,7-heptane tetraisocyanate, 2, 6-diisocyanatomethyl-3,5-dithia-1,7-heptane diisocyanate, 2,5-diisocyanatomethylthiophene, 4-isocyanatoethylthio-2,6-dithia-1,8-octanediisocyanate, 1,2-diisothiocyanatoethane, and 1,6-diisothiocyanatohexane.

One kind or two or more kinds of these compounds may be used.

The polyisocyanate component may contain at least one selected from the group consisting of 2,5-bis(isocyanatomethyl)-bicyclo[2.2.1]heptane, 2,6-bis(isocyanatomethyl)-bicyclo[2.2.1]heptane, 1,3-bis(isocyanatomethyl) cyclohexane, 1,4-bis(isocyanatomethyl) cyclohexane, 1,3-bis(isocyanatomethyl) benzene, 1,4-bis(isocyanatomethyl) benzene, dicyclohexylmethane-4,4'-diisocyanate, and isophorone diisocyanate, more preferably contains at least one selected from the group consisting of 1,3-bis(isocyanatomethyl) benzene, 2,5-bis(isocyanatomethyl)-bicyclo[2.2.1]heptane, 2,6-bis(isocyanatomethyl)-bicyclo[2.2.1]heptane, and 1,3-bis(isocyanatomethyl) cyclohexane from a viewpoint of more remarkably obtaining the above effect.

The addition amount of the polyisocyanate component may be 40% by mass or more, 43% by mass or more, or 45% by mass or more, and 60% by mass or less, 55% by mass or less, or 53% by mass or less with respect to the total amount of the polythiol component and the polyisocyanate component.

The addition amount of the polyisocyanate component may be 40% by mass or more and 60% by mass or less, 43% by mass or more and 55% by mass or less, or 45% by mass or more and 53% by mass or less with respect to the total amount of the polythiol component and the polyisocyanate component.

Examples of a combination of the polythiol component and the polyisocyanate component include:

(1) 1,3-bis(isocyanatomethyl) benzene and bis(mercaptomethyl)-3,6,9-trithia-1,11-undecanedithiol, (2) 1,3-bis(isocyanatomethyl) benzene and 4-mercaptomethyl-1,8-dimercapto-3,6-dithiaoctane, (3) 2,5-bis(isocyanatomethyl) bicyclo[2.2.1]heptane, 2,6-bis(isocyanatomethyl) bicyclo[2.2.1]heptane, 4-mercaptomethyl-1,8-dimercapto-3,6-dithiaoctane, and pentaerythritol tetrakis(3-mercaptopropionate), and (4) 1,3-bis(isocyanatomethyl) cyclohexane, 2,5-bis(mercaptomethyl)-1,4-dithiane, and pentaerythritol tetrakis(2-mercaptoacetate).

(Additive)

Examples of the additive include a polymerization catalyst, a release agent, an antioxidant, a coloring inhibitor, and a fluorescent whitening agent. One kind or two or more kinds of these additives may be used.

The additive preferably contains at least one selected from the group consisting of a polymerization catalyst, a release agent, and an ultraviolet absorber.

By mixing the above various components by a usual method, an optical component resin is obtained.

(Polymerization Catalyst)

Examples of the polymerization catalyst include a tin compound and a nitrogen-containing compound.

Examples of the tin compound include an alkyl tin compound and an alkyl tin halide compound.

Examples of the alkyl tin compound include dibutyl tin diacetate and dibutyl tin dilaurate.

Examples of the alkyl tin halide compound include dibutyl tin dichloride, dimethyl tin dichloride, monomethyl tin trichloride, trimethyl tin chloride, tributyl tin chloride, tributyl tin fluoride, and dimethyl tin dibromide.

Among these compounds, dibutyl tin diacetate, dibutyl tin dilaurate, dibutyl tin dichloride, and dimethyl tin dichloride may be used in some embodiments, and dimethyl tin dichloride may be used in some embodiments.

Examples of the nitrogen-containing compound include a tertiary amine, a quaternary ammonium salt, an imidazole-based compound, and a pyrazole-based compound. The tertiary amine is preferably a hindered amine.

Examples of the tertiary amine include triethylamine, tri-n-propylamine, triisopropylamine, tri-n-butylamine, triisobutylamine, N,N-dimethylbenzylamine, N-methylmorpholine, N,N-dimethylcyclohexylamine, pentamethyldiethylenetriamine, bis(2-dimethylaminoethyl) ether, N-methylmorpholine, N,N'-dimethylpiperazine, N,N,N',N'-tetramethylethylenediamine, and 1,4-diazabicyclo[2.2.2]octane (DABCO).

Examples of the hindered amine include 1,2,2,6,6-pentamethyl-4-piperidinol, 1,2,2,6,6-pentamethyl-4-hydroxyethyl-4-piperidinol, methyl-1,2,2,6,6-pentamethyl-4-piperidyl sebacate, a mixture of methyl-1,2,2,6,6-pentamethyl-4-piperidyl sebacate and bis(1,2,2,6,6-pentamethyl-4-piperidyl) sebacate, bis(1,2,2,6,6-pentamethyl-4-piperidyl) sebacate, bis(2,2,6,6-tetramethyl-1-(octyloxy)-4-piperidyl) sebacate, bis(1,2,2,6,6-pentamethyl-4-piperidyl) [[3,5-bis(1,1-dimethylethyl)-4-hydroxyphenyl] methyl] butyl malonate, and tetrakis(1,2,2,6,6-pentamethyl-4-piperidyl) butane-1,2,3,4-tetracarboxylate.

Examples of the quaternary ammonium salt include tetraethylammonium hydroxide.

Examples of the imidazole-based compound include imidazole, 1,2-dimethylimidazole, benzylmethylimidazole, and 2-ethyl-4-imidazole.

Examples of the pyrazole-based compound include pyrazole and 3,5-dimethylpyrazole.

Among these compounds, the tertiary amine such as a hindered amine, the imidazole-based compound, and the pyrazole-based compound may be used in some embodiments, and the hindered amine may be used in another some embodiments.

The addition amount of the polymerization catalyst may be 0.001 parts by mass or more, 0.005 parts by mass or more, or 0.007 parts by mass or more, and 2 parts by mass or less, 1 part by mass or less, 0.5 parts by mass or less with respect to 100 parts by mass of the total amount of the polythiol component and the polyisocyanate component.

The addition amount of the polymerization catalyst may be 0.001 parts by mass or more and 2 parts by mass or less, 0.005 parts by mass or more and 1 part by mass or less, or 0.007 parts by mass or more and 0.5 parts by mass or less with respect to 100 parts by mass of the total amount of the polythiol component and the polyisocyanate component.

(Release Agent)

Examples of the release agent include an acidic alkyl phosphate. The number of carbon atoms in an alkyl group of the acidic alkyl phosphate may be 1 or more, or 4 or more, and 20 or less, or 12 or less.

The acidic alkyl phosphate may be either a phosphoric monoester or a phosphoric diester. A mixture of a phosphoric monoester and a phosphoric diester may be used in some embodiments.

Examples of the acidic alkyl phosphate include isopropyl acid phosphate, butyl acid phosphate, octyl acid phosphate, nonyl acid phosphate, decyl acid phosphate, isodecyl acid phosphate, tridecyl acid phosphate, stearyl acid phosphate, propylphenyl acid phosphate, butylphenyl acid phosphate, and butoxyethyl acid phosphate.

The addition amount of the release agent may be 0.01 parts by mass or more, 0.05 parts by mass or more, or 0.10 parts by mass or more, and 1.00 part by mass or less, 0.50 parts by mass or less, or 0.30 parts by mass or less with respect to 100 parts by mass of the total amount of the polythiol component and the polyisocyanate component.

The addition amount of the release agent may be 0.01 parts by mass or more and 1.00 part by mass or less, 0.05 parts by mass or more and 0.50 parts by mass or less, or 0.10 parts by mass or more and 0.30 parts by mass or less with respect to 100 parts by mass of the total amount of the polythiol component and the polyisocyanate component.

<Degassing Step>

The polymerizable composition obtained in the mixing step may be treated in a degassing step.

Degassing is performed, for example, by treating the polymerizable composition under reduced pressure.

The pressure during degassing may be 10 Pa or more, 50 Pa or more, or 100 Pa or more, and 1000 Pa or less, 800 Pa or less, or 500 Pa or less.

The pressure during degassing may be 10 Pa or more and 1000 Pa or less, 50 Pa or more and 800 Pa or less, or 100 Pa or more and 500 Pa or less.

<Injection Step>

In the injection step, for example, the obtained polymerizable composition is injected into a molding die.

In a case where a spectacle lens is produced as an optical component, for example, a molding die including a pair of molds to form both main surfaces of the spectacle lens and a tape or a gasket having an adhesive layer on one side thereof for fixing these molds with a predetermined gap is used. The above-described mold may be formed of glass, ceramic, resin, or metal.

Prior to injection into the molding die, the polymerizable composition may be filtered. A filtration method is not particularly limited, but filtration may be performed using a filter having a pore diameter of 1 to 30 μm.

<Polymerization Step>

In the polymerization step, for example, the polymerizable composition is polymerized by heating.

Polymerization conditions may be set depending on the polymerizable composition and the shape of an optical component to be formed.

The polymerization initiation temperature and time may be from 0 to 50° C., or from 5 to 30° C., and 0.5 to 5.0 hours. The temperature is raised from the polymerization initiation temperature, and then heating may be performed to perform curing formation. For example, the maximum temperature after being raised is from 110 to 130° C.

After completion of the polymerization, the optical component may be released from a die and may be annealed.

By the above-described method, an optical component resin is obtained.

[Optical Component]

Examples of applications of the optical component resin include a spectacle lens, a camera lens, a prism, an optical fiber, a recording medium substrate used for an optical disc or a magnetic disk, and an optical component such as an optical filter attached to a display of a computer. Among these applications, the spectacle lens may be used in some applications.

The spectacle lens may include a lens substrate formed of an optical component resin (hereinafter also referred to as "spectacle lens substrate").

The surface shape of the spectacle lens substrate is not particularly limited and may be a flat surface, a convex surface, a concave surface, or the like.

The spectacle lens substrate may be a single focus lens, a multifocal lens, a progressive addition lens, or the like. For example, as one example, in the progressive addition lens, usually, a near portion area (near portion) and a corridor area (intermediate area) are included in a lower area, and a distance portion area (distance portion) is included in an upper area.

The spectacle lens substrate may be a finish type spectacle lens substrate or a semi finish type spectacle lens substrate.

The diameter of the spectacle lens substrate is not particularly limited, but is usually about 50 to 100 mm.

The thickness of the geometric center of the spectacle lens substrate is not particularly limited, but is usually about 0.8 to 30 mm.

The refractive index (ne) of the spectacle lens substrate is, for example, 1.53 or more, 1.55 or more, 1.58 or more, or 1.60 or more, and the upper limit thereof is not particularly limited. However, as the refractive index is higher, a lens may have a thinner thickness.

The Abbe number (ve) of the spectacle lens substrate is, for example, 20 or more, 25 or more, 30 or more, or 35 or more, and the upper limit thereof is not particularly limited. However, as the Abbe number is higher, a lens has a smaller a chromatic aberration.

The spectacle lens may include a spectacle lens substrate and a functional layer on a surface of the spectacle lens substrate.

As the functional layer, for example, at least one selected from the group consisting of a hard coat layer, a primer layer, an antireflection film, and a water repellent film may be used.

The hard coat layer is disposed for improving scratch resistance, and may be formed by applying a coating solution containing a fine particulate inorganic material such as an organic silicon compound, tin oxide, silicon oxide, zirconium oxide, or titanium oxide.

The primer layer is disposed for improving impact resistance, and contains, for example, polyurethane as a main component. Here, the content of polyurethane may be 50% by mass or more in the primer layer.

Examples of the antireflection film include a film obtained by laminating an inorganic material such as silicon oxide, titanium dioxide, zirconium oxide, or tantalum oxide.

The water repellent film may be formed using an organic silicon compound containing a fluorine atom.

The light transmittance of the spectacle lens in a wavelength range of 400 to 700 nm is preferably 70% or more, more preferably 80% or more, still more preferably 85% or more, and 100% or less.

The light cutting ratio of the spectacle lens in a wavelength of 380 nm is preferably 40% or more, more preferably 50% or more, still more preferably 60% or more, further still more preferably 70% or more, further still more preferably 80% or more, and 100% or less.

[Spectacles]

Spectacles according to an embodiment of the present invention include a spectacle lens and a frame in which the spectacle lens is mounted.

The frame includes, for example, a pair of rims, a bridge disposed between the rims, and a pair of temples each disposed at one end of each of the rims.

The rims may be half rims.

The frame may be a so-called rimless frame. In this case, for example, the spectacles include a pair of spectacle lenses, a bridge disposed between the spectacle lenses, and a pair of temples each disposed at one end of each of the spectacle lenses.

EXAMPLES

Hereinafter, specific Examples will be described concerning an embodiment of the present disclosure, but the present claims are not limited by the following Examples.

Measurement and evaluation of various numerical values were performed by the following method.

[Measuring Method]

<Hazen Color Number (APHA)>

The ultraviolet absorber was dissolved in toluene to prepare a toluene solution having a concentration of 10% by mass, and the Hazen color number (APHA) was measured by the method of JIS K0071-1:1998.

<Refractive Index and Abbe Number>

The refractive index of a sample was measured with F' line (488.0 nm), C' line (643.9 nm), and e line (546.1 nm) at 20° C. using a precision refractive index meter "KPR-2000 type" (manufactured by Kalnew Optical Industrial Co., Ltd.). The Abbe number was calculated from the following formula.

$$\text{Abbe number } v_e = (n_e - 1)/(n_{F'} - n_{C'})$$

$n_e$ indicates a refractive index measured with e line. $n_{F'}$ indicates a refractive index measured with F' line. $n_{C'}$ indicates a refractive index measured with C' line.

[Transmission Characteristics]

The transmittance was measured using a spectrophotometer "U-4100" (manufactured by Hitachi High-Technologies Corporation).

(Light Cutting Ratio at 380 nm)

In the measurement of the transmittance, a light cutting ratio at a wavelength of 380 nm was calculated using the following formula from the transmittance of light at a wavelength of 380 nm.

Light cutting ratio at wavelength of 380 nm=[1−transmittance of light with wavelength of 380 nm]×100

(Light Transmittance in Wavelength Range of 400 to 700 nm)

By measurement of the transmittance, the light transmittance in a wavelength range of 400 to 700 nm was measured.

[Evaluating Method]

<YI Value>

For a spectacle lens, transmittance spectroscopy was measured using a spectrophotometer "U-4100" (manufactured by Hitachi High-Technologies Corporation). Three stimulus values X, Y, and Z in standard light C were determined from the data, and a YI value was calculated using the following formula.

$$YI \text{ value} = 100(1.28X - 1.06Z)/Y$$

[Method for Preparing each Sample]

<Ultraviolet Absorber>

The Hazen color number (APHA) of each of ultraviolet absorbers used in Examples and Comparative Examples was adjusted by using a commercially available product as it was or performing recrystallization repeatedly.

The ultraviolet absorbers used in Examples and Comparative Examples are as follows.

(UV-1 P)

A sample obtained by adding methanol to a toluene solution of 2-(2-hydroxy-4-octyloxyphenyl)-2H-benzotriazole "Seesorb 707" (manufactured by Shipro Kasei Kaisha, Ltd.) and performing recrystallization for purification was used. The Hazen color number (APHA) thereof was 30.

(UV-1 C)

2-(2-hydroxy-4-octyloxyphenyl)-2H-benzotriazole "Seesorb 707" (manufactured by Shipro Kasei Kaisha, Ltd.) was used as it was without purification. The Hazen color number (APHA) thereof was 55.

(UV-2P)

A sample obtained by adding methanol to a toluene solution of 2-(2-hydroxy-4-ethyloxyphenyl)-2H-benzotriazole "T-52" (manufactured by Daiwa Kasei Industry, Co., Ltd.) and performing recrystallization for purification was used. The Hazen color number (APHA) thereof was 30.

(UV-2C)

2-(2-hydroxy-4-ethyloxyphenyl)-2H-benzotriazole "T-52" (manufactured by Daiwa Kasei Industry, Co., Ltd.) was used as it was without purification. The Hazen color number (APHA) thereof was 45.

Example 1

(Production of Spectacle Lens Substrate)

50.60 parts by mass of 1,3-bis(isocyanatomethyl) benzene as a polyisocyanate component, 0.012 parts by mass of dimethyltin dichloride as a polymerization catalyst, 0.15 parts by mass of an acidic phosphate "JP506H" (manufactured by Johoku Chemical Co., Ltd.) as a release agent, and 0.45 parts by mass of 2-(2-hydroxy-4-octyloxyphenyl)-2H-benzotriazole "Seesorb 707" (manufactured by Shipro Kasei Kaisha, Ltd.) having the Hazen color number (APHA) illustrated in Table as an ultraviolet absorber were added.

The resulting mixture was stirred until various additives were dissolved sufficiently. Thereafter, 49.40 parts by mass of a mixture of 4,7-bis(mercaptomethyl)-3,6,9-trithia-1,11-undecanedithiol, 4,8-bis(mercaptomethyl)-3,6,9-trithia-1,11-undecanedithiol, and 5,7-bis(mercaptomethyl)-3,6,9-trithia-1,11-undecanedithiol was added as a polythiol component and mixed to obtain a polymerizable composition. The composition of the polymerizable composition is illustrated in Table 1.

This polymerizable composition was degassed at 300 Pa for 45 minutes and then filtered with a polytetrafluoroethylene (PTFE) filter having a pore diameter of 5 μm. The polymerizable composition was injected into a molding die including a glass mold to form a 5 mm-thick plano lens and a gasket. The polymerizable composition which had been injected into the molding die was polymerized in an oven over 24 hours in a temperature range of 10° C. to 120° C.

The molding die was taken out of the oven, and the resulting product was removed from the molding die to obtain a spectacle lens substrate formed of the optical component resin (geometric center thickness (CT): 5 mm). The obtained spectacle lens substrate was annealed at 120° C. for two hours. The YI value and the transmission characteristics of the obtained spectacle lens substrate were measured.

Results thereof are illustrated in Table 1.

Examples 2 to 4, Comparative Examples 1 to 4, and Reference Examples 1 to 3

A spectacle lens substrate (geometric center thickness (CT): 5 mm) was obtained in a similar manner to Example 1 except that the types and amounts illustrated in Table 1 were used. The YI value and the transmission characteristics of the obtained spectacle lens substrate were measured. Results thereof are illustrated in Table 1.

TABLE 1

| | Polyisocyanate component | | Polythiol component | | Ultraviolet absorber | | | Optical characteristics | | Transmission characteristics | | Evaluation YI value |
|---|---|---|---|---|---|---|---|---|---|---|---|---|
| | | | | | | | | | | Light transmittance in wavelength | | |
| | Type | Amount*2 (parts by mass) | Type | Amount*2 (parts by mass) | Type | Hazen color number*1 (APHA) | Addition amount (parts by mass) | Refractive index (ne) | Abbe number (ve) | Light cutting ratio at 380 nm | range of 400 to 700 nm | |
| Reference Example 1 | A1 | 50.6 | B1 | 49.4 | — | — | 0 | 1.67 | 31 | 10 | 89 | 1.541 |
| Example 1 | A1 | 50.6 | B1 | 49.4 | UV-1P | 30 | 0.45 | 1.67 | 31 | 90 | 88 | 3.028 |
| Comparative Example 1 | A1 | 50.6 | B1 | 49.4 | UV-1C | 55 | 0.45 | 1.67 | 31 | 90 | 88 | 3.203 |
| Example 2 | A1 | 50.6 | B1 | 49.4 | UV-2P | 30 | 0.45 | 1.67 | 31 | 90 | 88 | 3.041 |
| Comparative Example 2 | A1 | 50.6 | B1 | 49.4 | UV-2C | 45 | 0.45 | 1.67 | 31 | 90 | 88 | 3.185 |
| Reference Example 2 | A2 | 50.28 | B2 B3 | 24.22 25.50 | — | — | — | 1.60 | 40 | 10 | 89 | 1.174 |
| Example 3 | A2 | 50.28 | B2 B3 | 24.22 25.50 | UV-1P | 30 | 1.00 | 1.60 | 40 | 90 | 88 | 2.215 |
| Comparative Example 3 | A2 | 50.28 | B2 B3 | 24.22 25.50 | UV-1C | 55 | 1.00 | 1.60 | 40 | 90 | 88 | 2.451 |
| Reference Example 3 | A3 | 47.54 | B4 B5 | 25.99 26.47 | — | — | — | 1.60 | 40 | 10 | 89 | 1.068 |
| Example 4 | A3 | 47.54 | B4 B5 | 25.99 26.47 | UV-1P | 30 | 1.00 | 1.60 | 40 | 90 | 88 | 2.272 |
| Comparative Example 4 | A3 | 47.54 | B4 B5 | 25.99 26.47 | UV-1C | 55 | 1.00 | 1.60 | 40 | 90 | 88 | 2.406 |

Notes and abbreviations in Table 1 are as follows.
*1 Hazen color number (APHA) in 10% by mass toluene solution
*2 Use amount of each component

[Polyisocyanate Component]
A1: 1,3-bis(isocyanatomethyl) benzene
A2: mixture of 2,5-bis(isocyanatomethyl)-bicyclo[2.2.1]heptane and 2,6-bis(isocyanatomethyl)-bicyclo[2.2.1]heptane
A3: 1,3-bis(isocyanatomethyl) cyclohexane

[Polythiol Component]
B1: mixture of 4,7-bis(mercaptomethyl)-3,6,9-trithia-1,11-undecanedithiol, 4,8-bis(mercaptomethyl)-3,6,9-trithia-1,11-undecanedithiol, and 5,7-bis(mercaptomethyl)-3,6,9-trithia-1,11-undecanedithio
B2: 4-mercaptomethyl-1,8-dimercapto-3,6-dithiaoctane
B3: pentaerythritol tetrakis(3-mercaptopropionate)
B4: 2,5-bis(mercaptomethyl)-1,4-dithiane
B5: pentaerythritol tetrakis(2-mercaptoacetate)

Finally, the embodiment of the present disclosure will be summarized.

An embodiment of the present disclosure is a method for producing an optical component resin, including a step of polymerizing a polymerizable composition containing a polythiol component, a polyisocyanate component, and an ultraviolet absorber, in which
the ultraviolet absorber has a Hazen color number (APHA) of 40 or less in a toluene solution thereof having a concentration of 10% by mass.

An Example described above provides a method for producing an optical component resin, suppressing yellowing due to addition of an ultraviolet absorber, for example.

The embodiment disclosed here is exemplary in all respects, and it should be considered that the embodiment is not restrictive. The scope of the present invention is defined not by the above description but by claims, and intends to include all modifications within meaning and a scope equal to claims.

The invention claimed is:

1. A method for producing an optical component resin, comprising a step of polymerizing a polymerizable composition containing a polythiol component, a polyisocyanate component, and an ultraviolet absorber, wherein
the ultraviolet absorber has a Hazen color number (APHA) of 40 or less in a toluene solution thereof having a concentration of 10% by mass, and
the ultraviolet absorber is obtained by repeating a purification.

2. The method according to claim 1, wherein the ultraviolet absorber contains a compound represented by formula (1):

[Chemical formula 1]

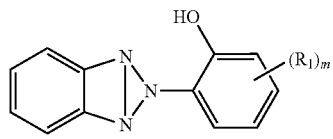

(1)

where $R_1$ represents an alkyl group having 1 or more and 12 or less carbon atoms or an alkoxy group having 1 or more and 12 or less carbon atoms, m represents an integer of 0 to 2, and when m represents 2, the plurality of $R_1$s may be the same or different.

3. The method according to claim 1, wherein the ultraviolet absorber contains at least one selected from the group consisting of 2-(2-hydroxy-5-methylphenyl)-2H-benzotriazole, 2-(2-hydroxy-5-octylphenyl)-2H-benzotriazole, 2-(2-hydroxy-4-octyloxyphenyl)-2H-benzotriazole, 2-(2-hydroxy-4-propyloxyphenyl) -2H-benzotriazole, and 2-(2-hydroxy-4-ethyloxyphenyl)-2H-benzotriazole.

4. The method according to claim 1, wherein the ultraviolet absorber has a content of 0.1 parts by mass or more and 2 parts by mass or less with respect to 100 parts by mass of a total amount of the polythiol component and the polyisocyanate component.

5. The method according to claim 1, wherein the polyisocyanate component contains at least one selected from the group consisting of 2,5-bis(isocyanatomethyl)-bicyclo[2.2.1]heptane, 2,6-bis(isocyanatomethyl) -bicyclo[2.2.1] heptane, 1,3-bis(isocyanatomethyl) cyclohexane, 1,4-bis (isocyanatomethyl) cyclohexane, 1,3-bis(isocyanatomethyl) benzene, 1,4-bis(isocyanatomethyl) benzene, dicyclohexyl-methane-4,4'-diisocyanate, and isophorone diisocyanate.

6. The method according to claim 1, wherein the polythiol component contains at least one selected from the group consisting of pentaerythritol tetrakismercaptopropionate, pentaerythritol tetrakismercaptoacetate, 2,5-bis(mercaptomethyl)-1,4-dithiane, 4,8-bis(mercaptomethyl)-1,3-dithiane, 4-mercaptomethyl-1, 8-dimercapto-3,6-dithiaoctane, 4,7-bis (mercaptomethyl)-3,6,9-trithia-1,11-undecanedithiol,4, 8-bis(mercaptomethyl)-3,6,9-trithia-1,11-undecanedithiol, and 5,7-bis(mercaptomethyl)-3, 6,9-trithia-1,11-undecanedithiol.

7. An optical component resin obtained by polymerizing a polymerizable composition containing a polythiol component, a polyisocyanate component, and an ultraviolet absorber, wherein
the ultraviolet absorber has a Hazen color number (APHA) of 40 or less in a toluene solution thereof having a concentration of 10% by mass, and
the ultraviolet absorber is obtained by repeating a purification.

8. An optical component comprising the optical component resin according to claim 7.

9. A spectacle lens comprising a lens substrate formed of the optical component resin according to claim 7.

10. The spectacle lens according to claim 9, wherein the spectacle lens has a light transmittance of 70% or more in a wavelength range of 400 to 700 nm.

11. The spectacle lens according to claim 9, wherein the spectacle lens has a light cutting ratio of 40% or more in a wavelength of 380 nm.

12. Spectacles comprising the spectacle lens according to claim 9.

13. The method according to claim 1, wherein the Hazen color number (APHA) is 20 or more and 35 or less.

14. The optical component resin according to claim 7, wherein the Hazen color number (APHA) is 20 or more and 35 or less.

15. The method according to claim 1, wherein the Hazen color number (APHA) is 25 or more and 33 or less.

16. The optical component resin according to claim 7, wherein the Hazen color number (APHA) is 25 or more and 33 or less.

* * * * *